United States Patent [19]

Suzuki et al.

[11] Patent Number: 5,206,473
[45] Date of Patent: Apr. 27, 1993

[54] NC LASER DEVICE

[75] Inventors: Kazuhiro Suzuki, Minamitsuru; Nobuaki Iehisa, Mishima, both of Japan

[73] Assignee: Fanuc Ltd., Minamitsuru, Japan

[21] Appl. No.: 601,720
[22] PCT Filed: Mar. 8, 1990
[86] PCT No.: PCT/JP90/00306
§ 371 Date: Oct. 23, 1990
§ 102(e) Date: Oct. 23, 1990
[87] PCT Pub. No.: WO90/10961
PCT Pub. Date: Sep. 20, 1990

[30] Foreign Application Priority Data
Mar. 15, 1989 [JP] Japan .................................. 1-62794

[51] Int. Cl.⁵ .............................................. B23K 26/02
[52] U.S. Cl. ............................ 219/121.83; 219/121.61; 364/474.08
[58] Field of Search ............ 219/121.6, 121.61, 121.83; 364/474.08

[56] References Cited

U.S. PATENT DOCUMENTS 5,059,760 10/1991 Iehisa et al. ..................... 219/121.83

FOREIGN PATENT DOCUMENTS 2004677 6/1990 Canada .

Primary Examiner—C. L. Albritton
Attorney, Agent, or Firm—Staas & Halsey

[57] ABSTRACT

There is provided an NC laser device including a combination of a numerical control device and a laser oscillator. A laser output command is sent to an output control circuit at the time of starting and the laser output is monitored by a power sensor to obtain a ratio of the command value to a monitored value. This ratio is stored in a non-volatile memory, the difference between this ratio and the ratio obtained at a previous start is obtained, and if the difference is higher than a predetermined set value, indicative that an abnormality has occurred during the non-operative period of the device, an alarm is displayed on a display screen.

3 Claims, 2 Drawing Sheets

NC LASER DEVICE

BACKGROUND OF THE INVENTION

1. Technical Field

This invention relates to an NC laser device which including combination of a numerical control device and a laser oscillator, and more particularly, to an NC laser device able to detect an abnormaly generated during a non-operative period thereof before machining is started.

2. Background Art

A gas laser oscillator using a $CO_2$ gas laser and so forth provides a high output with a high efficiency and has excellent beam characteristics, and thus is widely used as an NC laser device combined with a numerical control device (CNC) for metal machining and so forth. In such an NC laser device, the alignment of a rear mirror, a return mirror and an output mirror is precisely adjusted, and careful attention is paid to vibration from outside and to temperature control of cooling water for optical parts during operation, to avoid any misalignment.

Nevertheless, misalignment can be caused by an unexpected mechanical impact during a non-operative period of the device, such as during transporting and so forth, and when such a misalignment occurs, the laser output is greatly reduced and the beam mode becomes poor. In practice, a reduced laser output can be corrected by a power correction function or the like, but it is not wise to continually use this function as the oscillation efficiency is lowered and remains in that state. Moreover, the deterioration of beam mode cannot be corrected, and this leads directly to a lowering of the machining performance.

Such an abnormality generated during a non-operative period cannot be detected until an operator examines the machined state after actual machining, and thus if an abnormal condition has occurred, the whole workpiece becomes useless and the machining efficiency is lowered.

SUMMARY OF THE INVENTION

This invention was created in view of the above circumstances, and an object of the present invention is to provide an NC laser device able to detect an abnormality generated during a non-operative period of the device before machining is started.

To achieve the above object, according to the invention, there is provided an NC laser device having a combination of a numerical control device and a laser oscillator, and including a command means for commanding a specific laser output at the time of starting, monitoring means for monitoring the laser output, ratio calculating means for obtaining a ratio of a command value output from the above command means to a monitored value output from the above monitoring means, non-volatile memory means for storing the above ratio, and an abnormality detecting means for obtaining the difference between the above ratio and the ratio obtained at the previous start, and for displaying an alarm on a display screen when the above difference is higher than a predetermined set value.

A specific laser output is commanded at each start, and the ratio of the commanded value to a monitored value is obtained and stored. When a difference higher than a predetermined value exists between the ratio of this start and that of the previous start, it is concluded that an abnormality occurred during the non-operative period and an alarm is displayed.

DESCRIPTION OF THE PREFERRED EMBODIMENTS

An embodiment of this invention will be described with reference to the drawings.

Figure 1:
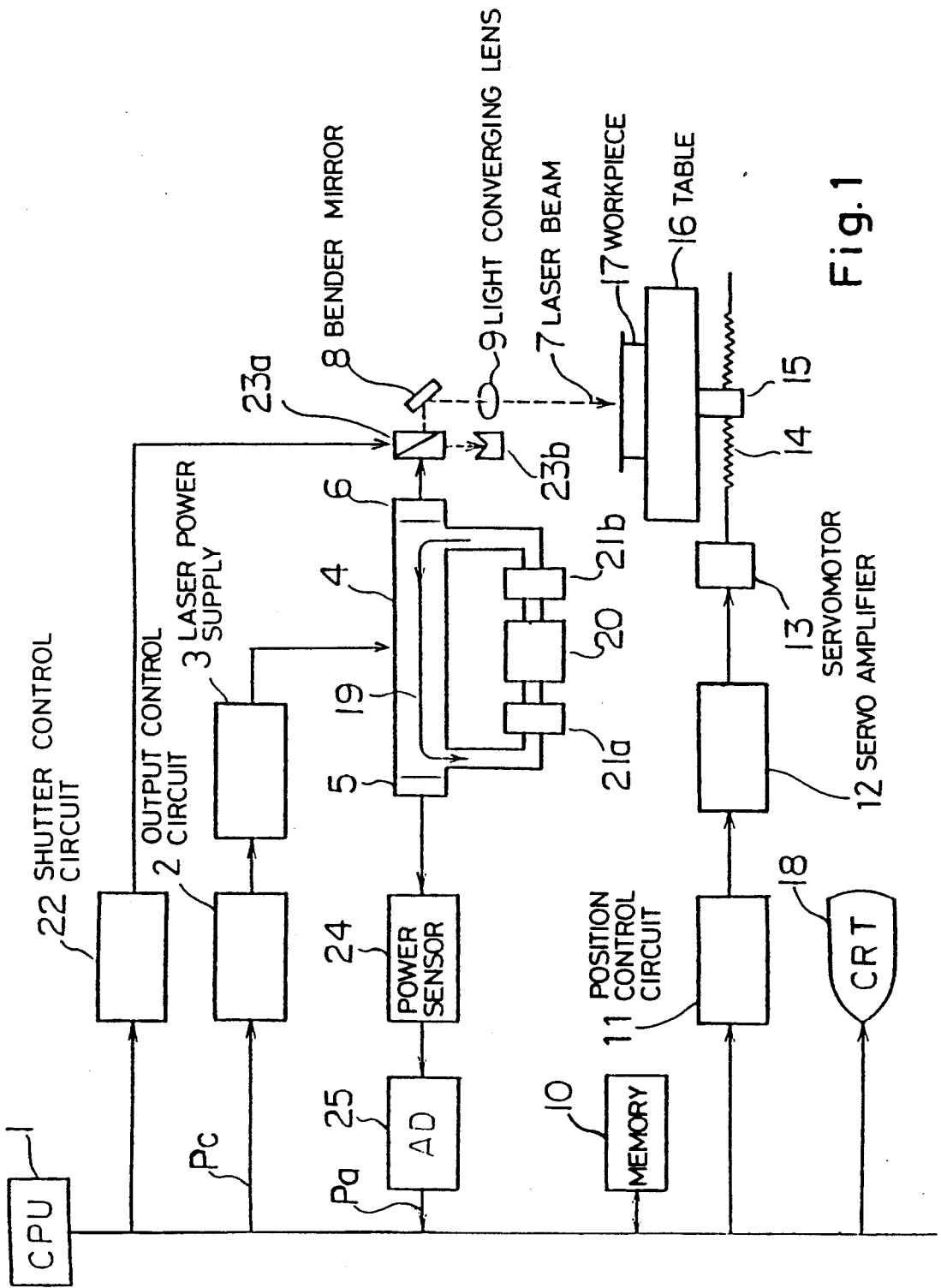
FIG. 1 is a block diagram showing an arrangement of an NC laser device according to one embodiment of this invention.

FIG. 1 is a block diagram showing an arrangement of an NC laser device of one embodiment of this invention. In FIG. 1, a processor (CPU) 1 controls the operation of the entire laser device in accordance with machining commands in a machining program, not shown. The processor 1 outputs a command value Pc, as described later, to an output control circuit 2 at the time of starting. The output control circuit 2 has a D/A converter therein and converts an output command value supplied from the processor 1 into a current command value, before outputting same. A power supply 3 for the laser device rectifies commercial power, generates a high-frequency voltage by a switching operation, and then supplies a high-frequency current corresponding to the current command value to a discharge tube 4.

A laser gas 19 is circulated within the discharge tube 4, and is excited by an electric discharge when a high-frequency current is supplied from the laser power supply 3. A rear mirror 5 is made of germanium (Ge) and has a reflectivity of 99.5%, and an output mirror 6 is made of zinc selenide (ZnSe) and has a reflectivity of 65%. These mirrors constitute a Fabry-Pérot resonator, whereby 10.6 $\mu$m light emitted from molecules of the excited laser gas is amplified and a part thereof is output to the outside from the output mirror 6 as a laser beam 7. The alignment of the rear mirror 5 with the output mirror 6 is accurately adjusted.

When a shutter 23a, described later, is open, the output laser beam 7 is deflected by a bender mirror 8, converged by a light converging lens 9 to a size of 0.2 mm or less, and is radiated onto a surface of a workpiece 17.

A memory 10 is a non-volatile memory which stores the machining program, various parameters and a power correction coefficient, described later, etc., and includes a battery-backup complementary metal oxide semiconductor device (CMOS) or the like. A ROM for storing a system program, and a RAM for storing temporary data, etc. are also included, other than this memory, but are omitted in this figure. A position control circuit 11 controls the rotation of a servomotor 13 through a servo amplifier 12 in accordance with a command supplied from the processor 1, and further controls the movement of a table 16 by a ball screw 14 and a nut 15, to thereby control the position of the workpiece 17. In the figure, only one axis is illustrated and the other axes are omitted. A display device 18 includes a CRT, a liquid crystal display device, or the like.

A blower 20 includes a Roots blower or the like and circulates the laser gas 19 through cooling units 21a and 21b. The cooling unit 21a serves to cool the laser gas 19 that has been heated to a high temperature due to the laser oscillation, and the cooling unit 21b serves to remove the heat due to compression produced by the blower 20.

A shutter control circuit 22 opens and closes the shutter 23a in accordance with a command supplied from the processor 1. The shutter 23a includes a copper plate or aluminum plate having a surface thereof plated with gold, and when closed, reflects the laser beam 7 from the output mirror 6 toward a beam absorber 23b for laser beam absorption. When the shutter 23a is open, the laser beam 7 is radiated onto the workpiece 17.

A power sensor 24 includes a thermocouple, photoelectric conversion element, or the like, and receives the laser beam output through a portion of the rear mirror 5 to measure the output power of the laser beam 7. An A/D converter 25 converts the output of the power sensor 24 into a digital value and supplies it as a monitor value Pa to the processor 1.

Figure 2:
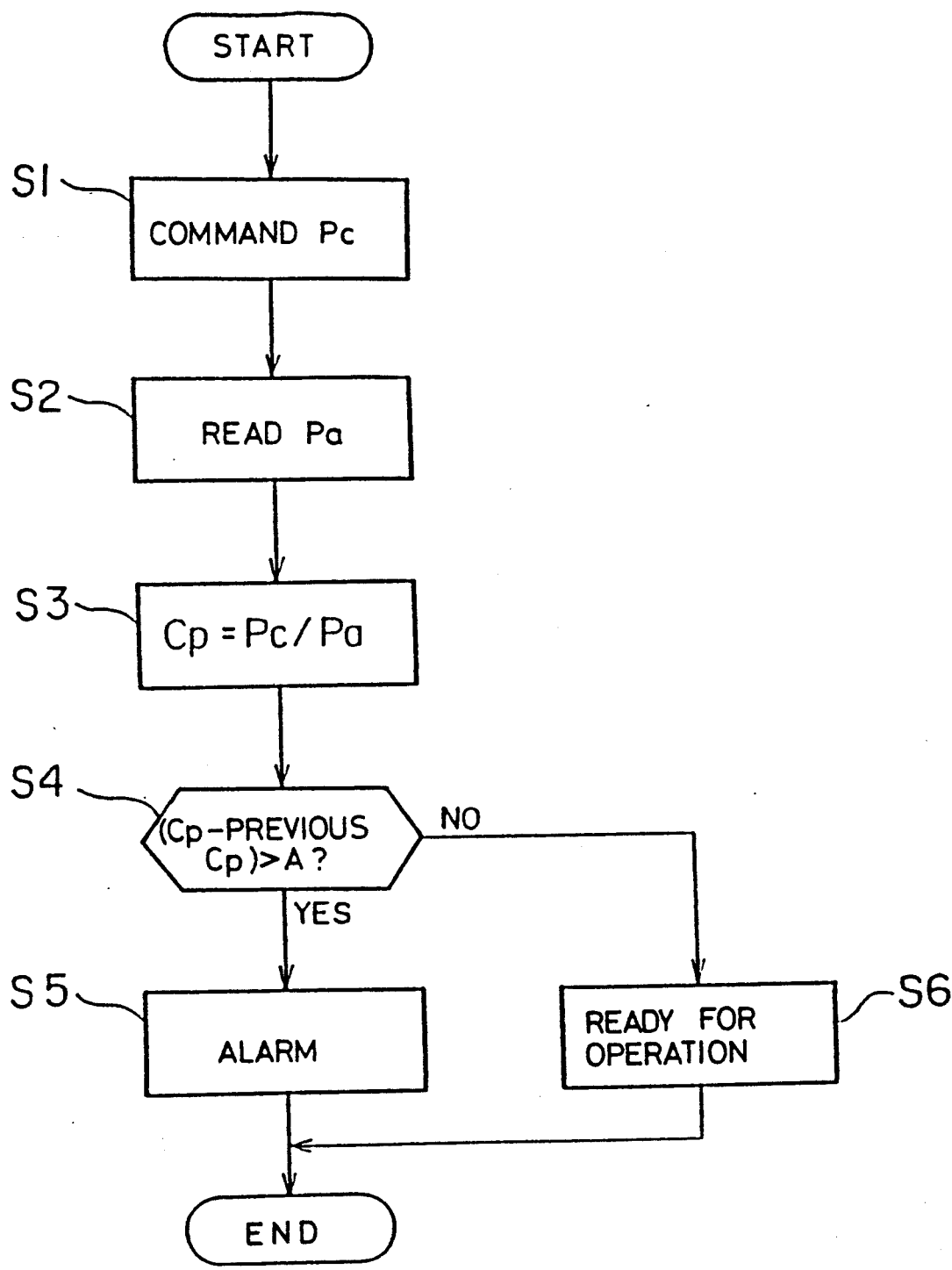
FIG. 2 is a flowchart of processing at a start of an NC laser device according to one embodiment of this invention.

The processing of the above NC laser device at the time of starting will be described with reference to the flowchart of FIG. 2. In the figure, the numbers following symbol "S" denote step numbers.

[S1] After starting, the command value Pc is supplied to the output control circuit 2 while the shutter 23a is closed and a laser oscillation is effected.

[S2] The monitored value Pa is read through the power sensor 24.

[S3] A power correction coefficient Cp is obtained by dividing the command value Pc by the monitor value Pa, and is stored in the memory 10. The power correction coefficient Cp is a coefficient for correcting a command value of the machining program so that the command value Pc coincides with the monitor value Pa in the subsequent operation. Namely, a subsequent command value Pc is expressed as;

$$Pc = (\text{command value of machining program}) \times Cp$$

and a lowering of the output due to a contamination of optical parts, which progresses with aging and slight composite changes, etc. is corrected, and a laser with a power of the command value can be always supplied. The higher the output lowering rate, the larger a value of the power correction coefficient.

[S4] The power correction coefficient Cp and a power correction coefficient obtained at the previous starting are of the NC laser read out of the memory 10, to obtain the difference therebetween, and it is determined whether or not the difference exceeds a limit value A. The limit value A is set at a value greater than a change amount of the power correction coefficient generated by one normal expected operation. If the difference exceeds the limit value A, the flow proceeds to S5, and if not, the flow proceeds to S6.

[S5] An alarm indicating that an abnormality has occurred during the non-operative period is displayed on the display device 18.

[S6] The flow ends when the machine is ready for operation.

As described above, according to this invention, a specific laser output is output at the time of starting to obtain the ratio of the command value to the monitored value, and if a difference higher than a predetermined value exists between the ratio obtained at this start and the ratio obtained at a previous start, an alarm is displayed. Therefore, even if an abnormality occurs during non-operative period, such as during transporting of the device and so forth, the abnormality can be detected before actual machining, which facilitates maintenance. Also, since workpieces are not wasted, the economic and machining efficiency is improved.

We claim:

1. An NC laser device having a combination of a numerical control device and a laser oscillator, and comprising:

command means for commanding a specific laser output at a time of starting of the laser oscillator;

monitoring means for monitoring the laser output;

ratio calculating means for obtaining a ratio of a command value output from said command means to a monitored value output from said monitoring means;

non-volatile memory means for storing said ratio; and abnormality detecting means for obtaining a difference between said ratio and the ratio obtained at a previous start of the laser oscillator and for producing an alarm when said difference is higher than a predetermined set value.

2. An NC laser device according to claim 1, wherein said ratio is a correction coefficient by which the command value is made to coincide with the monitored value in a subsequent operation.

3. An NC laser device having a combination of a numerical control device and a laser oscillator, and comprising:

command means for commanding a specific laser output at a time of starting of the device;

monitoring means for monitoring the laser output;

ratio calculating means for obtaining a ratio of a command value output from said command means to a monitored value output from said monitoring means;

non-volatile memory means for storing said ratio; and abnormality detecting means for obtaining a difference between said ratio and the ratio obtained at a previous start.

* * * * *